United States Patent [19]
Aab

[11] Patent Number: 5,977,735
[45] Date of Patent: Nov. 2, 1999

[54] TRACKING DETECTION SYSTEM OF ELECTRICAL SERVOMOTORS

[75] Inventor: Volker Aab, Lichtenau-Ulm, Germany

[73] Assignee: Robert Bosch GmbH, Stuttgart, Germany

[21] Appl. No.: 08/952,488

[22] PCT Filed: Dec. 18, 1996

[86] PCT No.: PCT/DE96/02445

§ 371 Date: Nov. 19, 1997

§ 102(e) Date: Nov. 19, 1997

[87] PCT Pub. No.: WO97/35242

PCT Pub. Date: Sep. 25, 1997

[30] Foreign Application Priority Data

Mar. 19, 1996 [DE] Germany ............... 196 10 626

[51] Int. Cl.⁶ .................................................. G05B 9/02
[52] U.S. Cl. ..................... 318/563; 318/601; 318/603; 318/636; 364/187
[58] Field of Search ............... 318/563, 600–605, 318/636; 364/167.01, 187, 184

[56] References Cited

U.S. PATENT DOCUMENTS 5,473,533  12/1995  Mengelt ............................. 364/152

FOREIGN PATENT DOCUMENTS

| 0603506 | 6/1994 | European Pat. Off. . |
|---|---|---|
| 0603506A2 | 6/1994 | European Pat. Off. . |
| 3227986 | 2/1984 | Germany . |
| 4321256 | 1/1994 | Germany . |

*Primary Examiner*—Brian Sircus
*Attorney, Agent, or Firm*—Venable; George H. Spencer; Norman N. Kunitz

[57] ABSTRACT

The invention relates to a tracking detection system of electrical servomotors with incremental position detection in particular for servomotors in motor vehicles. To determine the position, said tracking detection system is provided with a microcontroller with an autoalarm device. Said microcontroller can be moved from run mode (B1) to sleep mode (B0) to reduce the average current intake, and after a predetermined period of time (e.g. 1 mm) can be automatically moved back to run mode (B1). Said microcontroller samples the position signals (HS) of position transmitter when it is in run mode (B1) at particular sampling points (11, 12), and is move between the required sampling points for a particular, calculated period of time in sleep mode (B0). The particular, calculated period of time is calculated from a detected edge change of the position signal.

9 Claims, 2 Drawing Sheets

TRACKING DETECTION SYSTEM OF ELECTRICAL SERVOMOTORS

STATE OF THE TECHNOLOGY

The invention is based on a follow-up detection of electric adjusting motors with incremental position detection, in particular for adjusting motors in motor vehicles.

The European Published Patent Application No. 0 603 506 A2 discloses a method for determining the position of a motor vehicle part with electromotive activation in two direction. During the movement of the part in both its directions, counting pulses of a position indicator are entered into a counter for reducing or increasing the count in accordance with the predetermined movement. Following the shut-down of the drive motor, the pulses supplied by the position indicator are analyzed as to their distance in time from the point in time for shut-down and are assigned to a further movement of the counter, provided the time distance between pulses does not exceed a predetermined value. During a pole reversal of the drive motor, the counting direction is not assigned to the new movement direction until the distance between the pulses decreases again following the pole reversal.

This known method does not provide information concerning the measures that allow a follow-up detection in case of undervoltage conditions and the simultaneous saving of supply energy for the position detection and evaluation.

SUMMARY AND ADVANTAGE OF THE INVENTION

In contrast, the follow-up detection according to the invention of electric adjusting motors, has the advantage of saving current during the incremental position detection and position evaluation that is used, so that in the case of undervoltage conditions, the buffer capacity for the motor electronics can be selected to be small and, if necessary, can be installed easier therein.

In accordance with the invention, this is basically achieved in that a microcontroller with A7 automatic prompt device is provided for the position detection, which can be switched from an active operating mode to an inactive operating mode in order to reduce the average current consumption and can switch back again automatically to the active operating mode, following a time interval that can be predetermined, that the microcontroller polls the position signals of position indicators at specific sampling instants, that between the necessary sampling instants, the microcontroller is switched to the inactive operating mode for a specific, calculated time interval, and that the specific, calculated time interval is calculated starting with a detected edge change of the position signal.

Advantageous modifications and improvements of the follow-up detection described above are possible with other described features of the invention set forth in the additional claims.

In accordance with a first, advantageous embodiment of the invention, it is provided that the specific, calculated time interval during which the microcontroller is in the inactive operating mode, can be calculated starting with any detected edge change of the position signal, wherein it is taken into account that the position signal interval, determined through polling technology, can be smaller by one sampling interval than the actual value owing to the discrete-time sampling.

A useful modification of this embodiment provides that the specific, calculated time interval during which the microcontroller is in the inactive operating mode, is calculated based on the following formula:

$$t_{sleep-new} = (N_{HF}-1)t_{sleep-old} + (N_{HF}-2)t_{run} \text{ when } N_{HF} \geq 2$$

or $$t_{sleep-new} = T_{sleep-old} \quad \text{when } N_{HF} < 2$$

$N_{HF}$ refers to the number of sampling instants since the last edge change of the Hall sensors used as position indicators;

$t_{sleep-new}$ refers to the new interval during which the microcontroller is in the inactive operating mode;

$t_{sleep-old}$ refers to the actual interval during which the microcontroller is in the inactive operating mode, $t_{run}$ refers to the interval during which the microcontroller is in the active operating mode;

and it is assumed that a dual sampling takes place.

According to a second, very advantageous embodiment of the follow-up detection according to the invention, the specific, calculated time interval during which the microcontroller is in the inactive operating mode is calculated such that starting with a first sampling instant and a first sampling interval, the following sampling instants are determined in such a way that the following sampling instants continue to double until an edge change of the position signal is detected.

In a further advantageous design of this alternative embodiment of the invention, the procedure of doubling the sampling instants starts again at the instant at which the edge change is detected, until the following edge change is reached, wherein the next to the last sampling interval provides the starting value for the first sampling interval following the first edge change.

It is particularly advantageous if the specific, calculated time interval in which the microcontroller is in the inactive operating mode is calculated for the follow-up detection according to the invention by subtracting the time assumed for detecting the position signals from the time for the sampling interval.

In a particularly useful embodiment of the invention, the microcontroller used comprises a low-frequency oscillator, the microcontroller has a circuit that generates from the low frequency of this oscillator a considerably higher clocking frequency for the microcontroller core, the oscillator is integrated as original component into the microcontroller, and an undervoltage detection is provided, the output signal of which can be fed directly into the microcontroller core.

For one advantageous modification of this special embodiment of the invention it is provided that the microcontroller has a time-switching logic, which admits a prompt circuit following completion of a time interval that can be predetermined differently, so that this prompt circuit switches the microcontroller core from the inactive to the active operating mode.

BRIEF DESCRIPTION OF DRAWINGS

The invention is explained in more detail in the following description with the aid of several embodiments shown in the drawing, wherein.

DETAILED DESCRIPTION OF THE EXEMPLARY EMBODIMENTS

Figure 1:
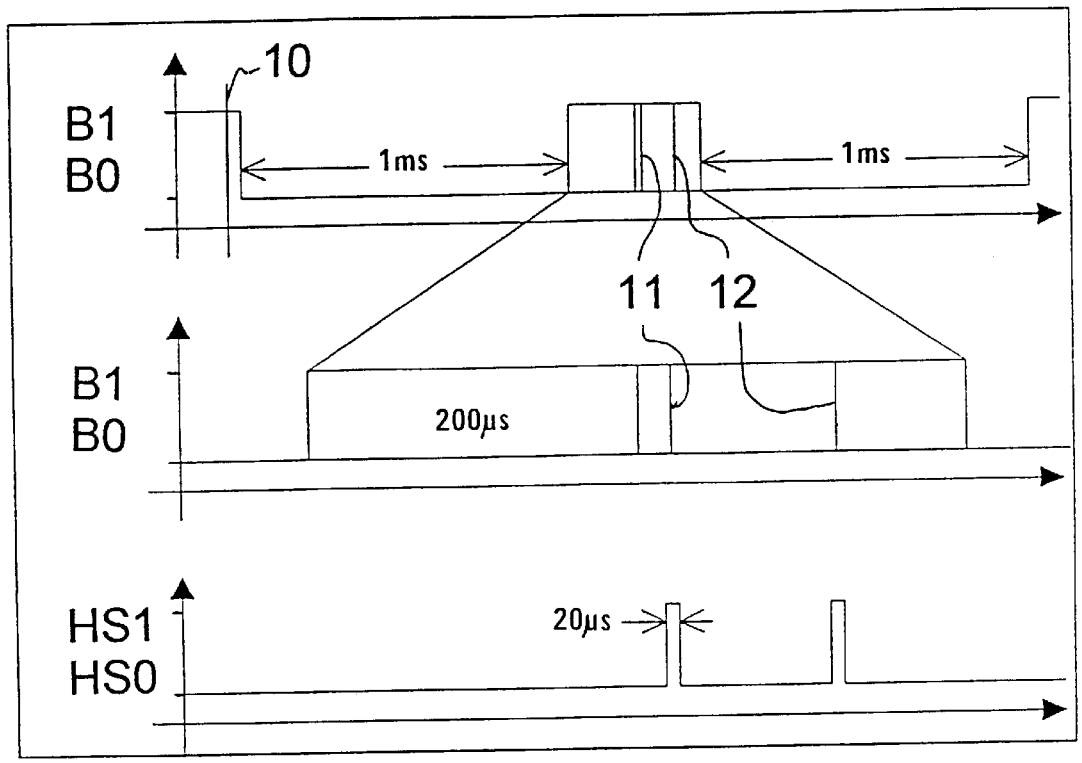
FIG. 1 a time-dependency diagram showing the connection between active and inactive operating mode, following the detection of an undervoltage condition in two different scales, as well as the assignment in time to the position signals.

A time-dependency diagram is shown in FIG. 1, which illustrates the connection between the active B1 and the inactive B0 operating mode, following the detection of an undervoltage condition 10 in two different scales, as well as the assignment in time to two position signals HS, which are preferably supplied by Hall sensors and are electrically displaced by 90°. In the lower line of FIG. 1, the existence of a position signal HS is denoted with HS1 and the non-existence with HS0.

For a better understanding, this embodiment as well as the second embodiment, described later on, is to be explained with the aid of a special use.

A position detection by means of incremental indicators is frequently used in electric adjusting drives for motor vehicles. Hall sensors, for example, can be used for this purpose. Such drives with position detection are used, for example, for electric window openers with jamming protection, sliding roofs and seat adjustment devices with memory function. A position detection for such systems should still be possible, even following an emergency shut-down caused by undervoltage, in particular a disconnecting of the battery or the responding of a vehicle safety device during the adjustment operation. The follow-up time for a typical adjusting motor can take up to 100 ms. Since the position data must subsequently also be recorded in a non-volatile memory, the system, comprising a microcontroller and sensing devices, not shown in further detail in the figures must be supplied from one capacitor for buffer times of approximately 120 ms.

Generally, the minimum on-board voltage where the drives are still actuated is 9 V. Approximately 1.2 V must be calculated for reverse pole-connection diode and the voltage drop on a voltage regulator. The minimum operating voltage for Hall sensors, designed for the position detection, and microcontrollers is approximately 3.8 V. This results in a reliable voltage drop at the buffer capacitor of $$AU = 9V - 1.2V - 3.8V - 4V.$$

Assuming a total current consumption of 30 mA for this system, this results a minimum value for the buffer capacitor of $$C = \frac{I \cdot \Delta t}{\Delta U} = \frac{30 \text{ mA} \cdot 120 \text{ ms}}{4 \text{ V}} = 900 \text{ } \mu F$$

As a result of their large dimensions, it is very difficult to integrate capacitors with this capacity into the standard electronic motor controls.

In order to reduce the average current consumption of the system, the microcontroller and the Hall sensors are turned on only at times to scan the sensor level. A microcontroller can be used preferably for this purpose, which is described in the Application "Microcontroller with Prompt Device," submitted by the applicant at the same time, and which meets the following requirements:

the microcontroller has a current-saving inactive operating mode (power down or sleep mode);

the start-up time for the microcontroller is clearly shorter than the sampling interval to be expected;

the microcontroller comprises an undervoltage detection, which is connected directly to the on-board voltage, e.g. as a threshold value detector, and thus determines the undervoltage condition without (1), time delay as well as feeds this information directly to the microcontroller core;

finally, following completion of a specific time interval after being switched to the inactive operating mode, the microcontroller (2) is again switched to the active operating mode (run mode) through its automatic prompt device.

For the follow-up or running down of braked direct-current motors, it can be assumed that the motor rotational speed decreases monotonously. From this, it follows that the time intervals of successive position signals, e.g., the Hall sensor pulses, increase constantly. At the point in time of shut-down or if an undervoltage condition occurs, the motor rotational speed can be very high, e.g. the idle-running rotational speed with increased on-board voltage. That is the reason why the Hall sensor output signals must be scanned and entered at very short time intervals. With a decrease in the rotational speed, the time interval between two successive sampling and evaluation operations can be increased. The time-dependency diagram in FIG. 1 shows an example for the course over time of the detection of the Hall sensor signals. The sampling intervals are selected such that they are shorter than the time between two successive Hall sensor edges. For standard motors having a rotational speed of <100/s, this results in a sampling interval of ≈1.5 ms. The microcontroller must be prompted from its inactive mode within this time interval and must detect the Hall sensor signals. The time interval for the inactive operating mode is accordingly shorter and can be 1 ms, for example, as shown in FIG. 1.

If the undervoltage condition is detected by the microcontroller, which is indicated in FIG. 1 by the reference number 10, then the motor relays are turned off and the motor is braked. The detection of the Hall sensor signals is at the same time switched from event control to polling technology (polling). A time-switching logic is subsequently activated in the microcontroller and is loaded with the time interval for the inactive operating mode, e.g. 1 ms. Following this, the microcontroller is switched immediately to the inactive operating mode. The time-switching logic then operates with low frequency, e.g. 100 kHz. Once the microcontroller has been prompted automatically by the time-switching logic and via the prompt circuit, following the completion of its sleep time, the phase control circuit used as a high-frequency clock generator requires approximately 200 µs, until the microprocessor provides its stable system clocking. For the purpose of debouncing, the sensor signals are subsequently detected in a first sampling 11 and are input once more after 100 µs during a second sampling 12.

If several sampling intervals are located between two mode changes of the Hall sensor output signals, then the time interval for the inactive operating mode, the sleep time, and thus also the length of the sampling interval are increased.

In accordance with the first exemplary embodiment of the invention, the new time interval for the inactive operating mode is determined according to the following formula:

$$t_{sleep-new} = (N_{HF}-1)t_{sleep-old} + (N_{HF}-2)t_{run} \text{ when } N_{HF} \geq 2$$

or $$t_{sleep-new} = T_{sleep-old} \text{ when } N_{HF} < 2$$

$N_{HF}$ refers to the number of sampling instants since the last edge change of the Hall sensors used as position indicators;

$t_{sleep-new}$ refers to the new interval during which the microcontroller is in the inactive operating mode;

$t_{sleep-old}$ refers to the actual interval during which the microcontroller is in the inactive operating mode;

$t_{run}$ refers to the interval in which the microcontroller is in the active operating mode;

and it is assumed that a dual sampling takes place.

With this first embodiment, the new sleep time $t_{sleep-new}$ is determined respectively following a detection of an edge change. The calculation takes into account that the Hall sensor interval determined with the sampling can be smaller by one sampling interval than the actual value owing to the discrete-time sampling.

Figure 2:
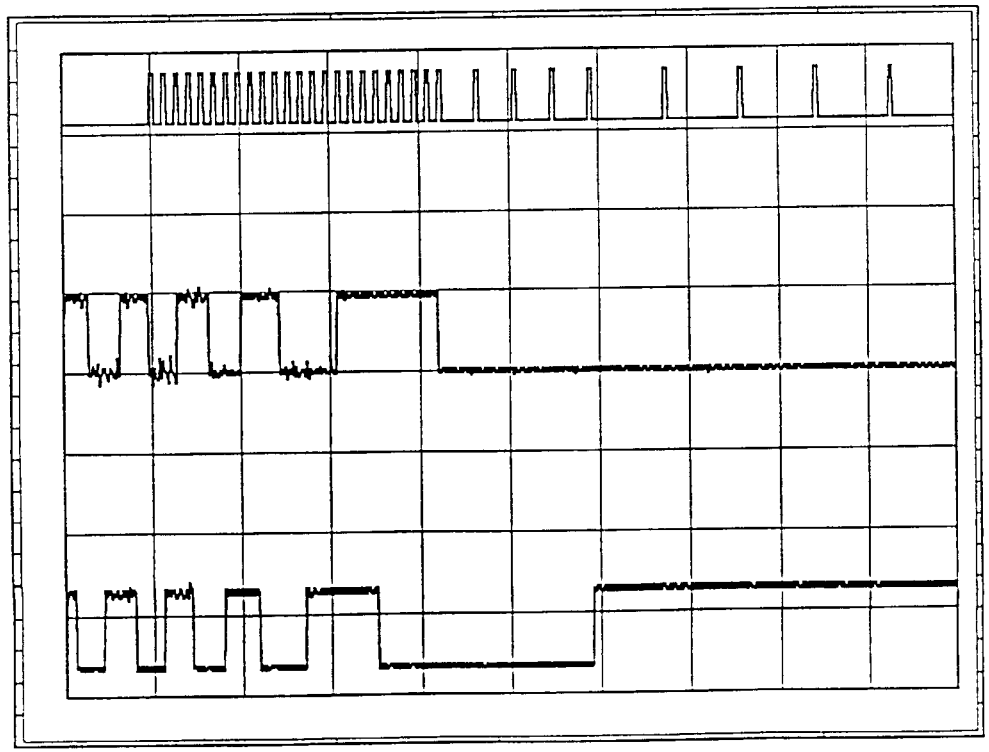
FIG. 2 a pulse diagram of a first exemplary embodiment with associated sampling-time windows in the upper line and two position signals in the center and lower line, which are electrically displaced against each other by 90°.

FIG. 2 shows the pulse diagram for this first exemplary embodiment with the associated sampling-time windows in the upper line, and two position signals that are electrically displaced against each other by 90° in the center and lower line. In accordance with the above formula, the sampling-time windows shown in the upper line are oriented on the edges for the Hall sensor signals. The increase in the sleep time, in which the microcontroller is in the inactive operating mode and the increase in the sampling intervals shows up very clearly.

Figure 3:
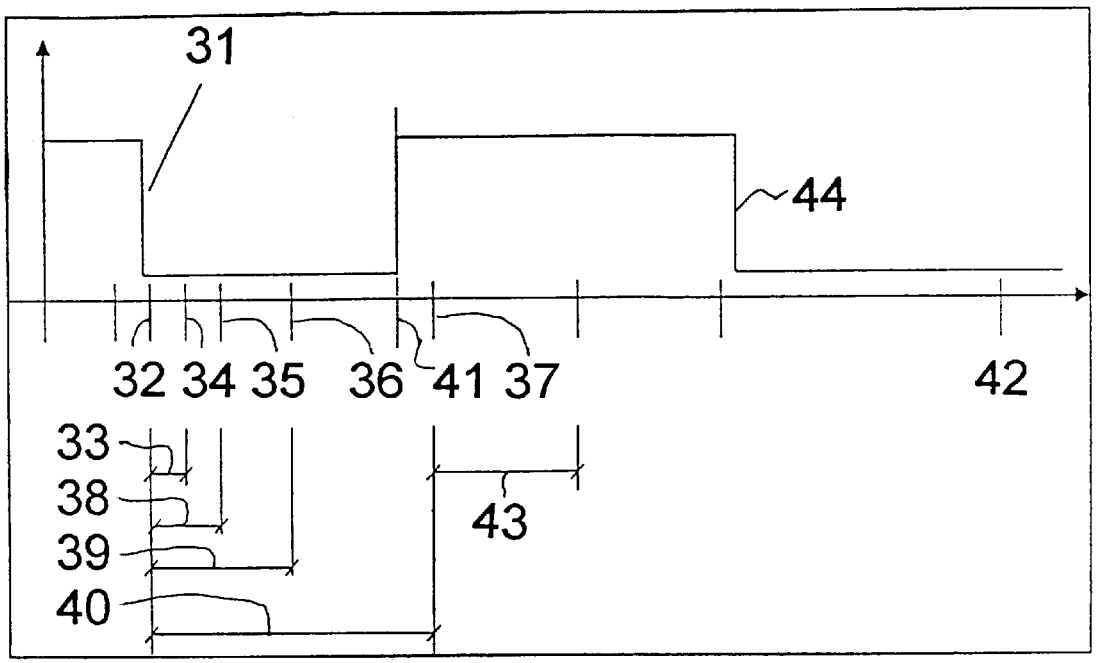
FIG. 3 schematically shows a pulse diagram for explaining the definition of the sampling-time windows, based on the second embodiment according to the invention, and FIG. 4 a pulse diagram of the second exemplary embodiment with the associated sampling-time windows in the upper line and two position signals in the center and lower line that are electrically displaced against each other by 90°.

In accordance with a second embodiment of the invention, the length of the inactive operating mode can be determined in an alternative way. This is explained in connection with the illustration in FIG. 3. FIG. 3 shows a Hall sensor signal 31. Starting with a first sampling instant 32, directly following an edge change, and a first sampling interval 33, the following sampling intervals 34, 35, 36, 37 are determined such that relative to the first sampling instant 1 and the coordinated first sampling interval 2, the sampling intervals 38, 39, 40 continue to double until an edge change 41 is detected.

The procedure of doubling the sampling instants or the sampling intervals starts anew at the sampling instant 37, for which the edge change 41 is detected, until the next edge change 44 of the position signal is determined, e.g. with the sampling instant 42. The next to the last sampling interval 39 is the starting value for the first sampling interval 43, following the first edge change 41. If the next edge change 44 is detected at the sampling instant 42, then the same steps are taken once more as for the last edge change 41 with the associated detected sampling instant 37. The sampling interval 43 is the starting interval for determining the sampling instants following the edge change 44.

The length of the time interval for the inactive operating mode, the sleep time, follows from the length of the sampling interval, reduced by the time that is assumed for detecting the Hall sensor signal, which corresponds to the time for the active operating mode, the run or operating time, of the microcontroller. The respectively resulting time values are adjusted in the time-switching logic of the microcontroller, so that this microcontroller is again prompted automatically via the prompt circuit following completion of the respective time interval.

Figure 4:
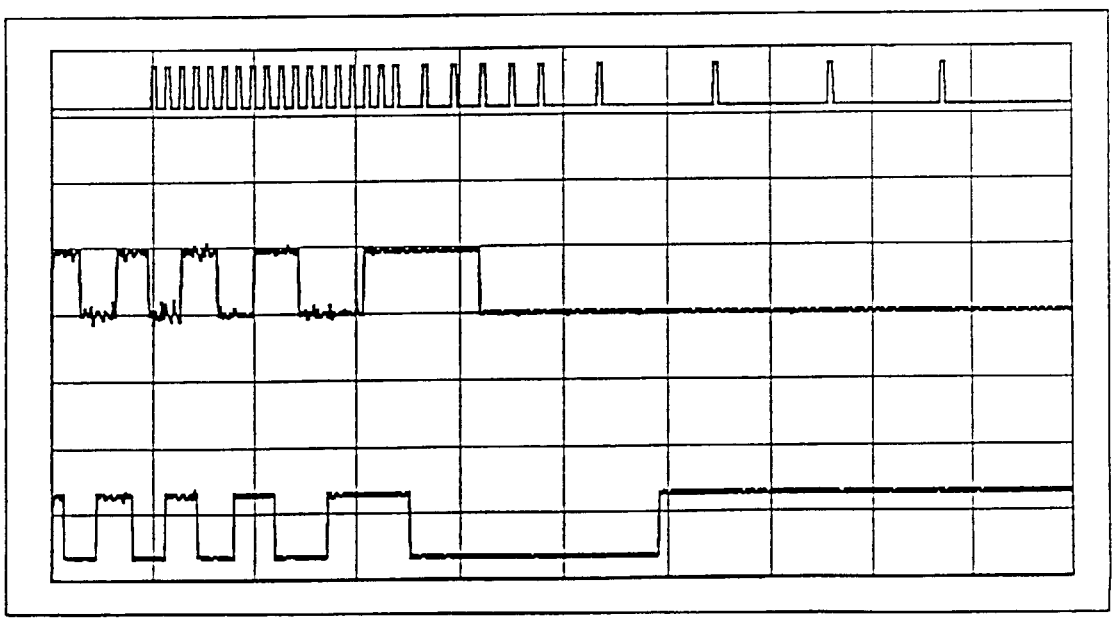

In FIG. 4, the pulse diagram for this second exemplary embodiment is shown with associated sampling-time windows in the upper line and two position signals that are electrically displaced against each other by 90° in the center and lower line. The sampling-time windows or intervals, shown in the upper line, are oriented on the edges of the Hall sensor signals, in accordance with the above formula. The increase in the sleep time, in which the microcontroller is in the inactive operating mode, and the increase in the sampling intervals are shown clearly.

A comparison of the number of sampling-time windows determined in FIG. 2 and FIG. 4, which are respectively shown in the upper line, shows that considerably fewer sampling-time windows are needed for the method based on the second embodiment for the same constellation of the position signals in order to securely detect the position signals. In other words, this means that in this case, the time intervals for the inactive operating mode are considerably longer and the required energy thus is considerably reduced.

For the follow-up detection of electric adjusting motors, in particular direct-current motors, the invention takes into account the drop in the rotational speed during the shutdown. As a result of this, it is possible at the same time to keep the buffer capacities low and to have longer follow-up monitoring times with the same buffer capacity than is the case with fixed sampling intervals.

For the method upon which the first embodiment is based, the adaptation of the sampling intervals is always made advantageously after a new edge change of the position signal has been detected. For the method upon which the second embodiment is based, the adaptation of the sampling intervals is carried out in an alternative and advantageous way even without the edge change through the respective increase in the sampling instants or the sampling intervals. This method in particular covers those cases where only one edge is detected after the motor is turned off or an undervoltage condition occurs.

I claim:

1. A method of follow-up detection of electric adjusting motors with incremental position detection comprising the following steps in combination: providing a microcontroller with an automatic prompt device for the position detection, which microcontroller is switched from an active operating mode (B1) to an inactive operating mode (B0) in order to reduce the average current consumption and which is switched back automatically to the active operating mode (B1), following a predeterminable time interval, polling the position signals (HS) of position indicators at specific sampling instants with the microcontroller, placing the microcontroller for a specific, calculated period in the inactive operating mode (B) between necessary sampling instants, and calculating the specific, calculated time period starting with a detected edge change of the position signal (HS).

2. A method of follow-up detection according to claim 1, wherein the step of calculating the specific, calculated time period during when the microcontroller is in the inactive operating mode (B0), includes the time period starting with each detected edge change of the position signal (HS), while taking into account that the position signal interval, which is determined through polling, can be smaller by one sampling interval than the actual value as a result of the discrete-time sampling.

3. A method of follow-up detection according to claim 2, wherein the specific, calculated time period during which the microcontroller is in the inactive operating mode (B0) is calculated during the step of calculating based on the following equations:

$$t_{sleep\_new}=(N_{HF}-1)t_{sleep\_old}+(N_{HF}-2)t_{run} \text{ when } N_{HF} \geq 2$$

and $$t_{sleep\_new}=(N_{HF}-1)t_{sleep\_old} \quad \text{when } N_{HF}<2$$

wherein $N_{HF}$ refers to the number of sampling instants since the last edge change for the Hall sensors used as position indicators;

$t_{sleep\_new}$ refers to the new interval during which the microcontroller is in the inactive operating mode;

$t_{sleep\_old}$ refers to the actual interval during which the microcontroller is in the inactive operating mode;

$t_{run}$ refers to the interval during which the microcontroller is in the active operating mode; and it is assumed that a dual sampling takes place.

4. A method of follow-up detection according to claim 1, wherein the specific, calculated time period during which the microcontroller is in the inactive operating mode (B0) is calculated during said step of calculating such that starting with a first sampling instant and a first sampling interval, following sampling instants are determined such that the following sampling instants continue to double until a edge change of the position signal is detected.

5. A method of follow-up detection according to claim 4, wherein the step of calculating further includes starting the procedure of doubling the sampling instants anew at the instant at which the edge change is detected until the next edge change is reached, wherein the next to the last sampling interval is the starting value for the first sampling interval following the first edge change.

6. A method of follow-up detection according to claim 1, wherein the specific, calculated time period during which the microcontroller is in the inactive operating mode (B0), is calculated during said step of calculating by subtracting the time assumed for detecting the position signals from the time for the sampling interval.

7. A method of follow-up detection according to claim 1, wherein the step of providing further includes providing the microcontroller with a low frequency oscillator, that is integrated as an original component in the microcontroller, and with a circuit which generates a considerably higher clocking frequency for the microcontroller core from the low frequency of this oscillator; and the step of polling includes upon detection of an undervoltage feeding a corresponding output signal directly to the microcontroller core.

8. A method of follow-up detection according to claim 7, wherein the step of providing further includes providing the microcontroller with a time-switching logic, which acts on a prompt circuit following completion of a time interval that can be predetermined differently, so that this prompt circuit switches the microcontroller core from the inactive (B0) to the active (B1) operating mode.

9. A method of follow-up detection according to claim 1, wherein the specific, calculated time period during which the microcontroller is in the inactive operating mode (B0) is calculated during the step of calculating based on the following equations:

$$t_{sleep\_new}=(N_{HF}-1)t_{sleep\_old}+(N_{HF}-2)t_{run} \text{ when } N_{HF} \geq 2$$

and $$t_{sleep\_new}=(N_{HF}-1)t_{sleep\_old} \quad \text{when } N_{HF}<2$$

wherein $N_{HF}$ refers to the number of sampling instants since the last edge change for the Hall sensors used as position indicators;

$t_{sleep\_new}$ refers to the new interval during which the microcontroller is in the inactive operating mode;

$t_{sleep\_old}$ refers to the actual interval during which the microcontroller is in the inactive operating mode;

$t_{run}$ refers to the interval during which the microcontroller is in the active operating mode; and it is assumed that a dual sampling takes place.

\* \* \* \* \*